US009565736B2

(12) United States Patent
Aliakseyeu et al.

(10) Patent No.: US 9,565,736 B2
(45) Date of Patent: Feb. 7, 2017

(54) LIGHTING SYSTEM HAVING A CONTROLLER THAT CONTRIBUTES TO A SELECTED LIGHT SCENE, AND A METHOD FOR CONTROLLING SUCH A SYSTEM

(71) Applicant: PHILIPS LIGHTING HOLDING B.V., Eindhoven (NL)

(72) Inventors: Dzmitry Viktorovich Aliakseyeu, Eindhoven (NL); Leszek Holenderski, Eindhoven (NL); Alexandre Georgievich Sinitsyn, Veldhoven (NL); Maulin Dahyabhai Patel, Tuckahoe, NY (US); Saeed Reza Bagheri, Croton-on-Hudson, NY (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/765,589

(22) PCT Filed: Jan. 27, 2014

(86) PCT No.: PCT/IB2014/058559
§ 371 (c)(1),
(2) Date: Aug. 4, 2015

(87) PCT Pub. No.: WO2014/122551
PCT Pub. Date: Aug. 14, 2014

(65) Prior Publication Data
US 2015/0373810 A1 Dec. 24, 2015

Related U.S. Application Data

(60) Provisional application No. 61/761,765, filed on Feb. 7, 2013.

(51) Int. Cl.
*H05B 33/08* (2006.01)
*H05B 37/02* (2006.01)
*G06F 3/041* (2006.01)

(52) U.S. Cl.
CPC ......... *H05B 33/0863* (2013.01); *G06F 3/0412* (2013.01); *H05B 33/0845* (2013.01);
(Continued)

(58) Field of Classification Search
CPC ... H05B 37/02; H05B 37/029; H05B 37/0245; H05B 37/0272; H05B 37/0845; H05B 33/0863; H05B 33/0803; H05B 37/0281; G06F 3/0412
(Continued)

(56) References Cited

U.S. PATENT DOCUMENTS 6,466,234 B1 10/2002 Pyle et al.
7,511,631 B1 3/2009 Breslau et al.
(Continued)

FOREIGN PATENT DOCUMENTS

JP 2011071680 A 4/2011
WO 2007069143 A2 6/2007
(Continued)

*Primary Examiner* — Haissa Philogene
(74) *Attorney, Agent, or Firm* — Meenakshy Chakravorty

(57) ABSTRACT

A lighting system comprising light sources for illuminating an area and a control unit adapted to control the light sources. The control unit has a user interface allowing a user to select a light scene. The user interface has a screen for displaying information to the user. The control unit is adapted to control the user interface to display selected content on the screen, which content is selected such that light emitted from the screen during display of the content contributes to the selected light scene. When the screen is used in this way, i.e. as a part of the light scene created by the lighting system, the screen enhances the light scene and
(Continued)

the risk of the screen interfering with the light scene is reduced, resulting in an improved user experience.

13 Claims, 2 Drawing Sheets

(52) U.S. Cl.
CPC ....... *H05B 37/029* (2013.01); *H05B 37/0245* (2013.01); *H05B 37/0272* (2013.01)

(58) Field of Classification Search
USPC ........ 315/391–295, 297, 307, 312, 316, 360
See application file for complete search history.

(56) References Cited

U.S. PATENT DOCUMENTS

| | | | |
|---|---|---|---|
| 8,368,310 B1* | 2/2013 | Roosli | H05B 37/0245 315/152 |
| 8,373,366 B2* | 2/2013 | Baaijens | H05B 37/029 315/295 |
| 2008/0303918 A1 | 12/2008 | Keithley | |
| 2009/0174673 A1 | 7/2009 | Ciesla | |
| 2010/0094439 A1* | 4/2010 | Van De Meulenhof | H05B 37/029 700/90 |
| 2010/0103172 A1 | 4/2010 | Purdy | |

FOREIGN PATENT DOCUMENTS

| | | |
|---|---|---|
| WO | 2008146245 A1 | 12/2008 |
| WO | 2010079400 A1 | 7/2010 |
| WO | 2011013035 A1 | 2/2011 |
| WO | 2012131544 A1 | 10/2012 |

* cited by examiner

LIGHTING SYSTEM HAVING A CONTROLLER THAT CONTRIBUTES TO A SELECTED LIGHT SCENE, AND A METHOD FOR CONTROLLING SUCH A SYSTEM

CROSS-REFERENCE TO PRIOR APPLICATIONS

This application is the U.S. National Phase application under 35 U.S.C. §371 of International Application No. PCT/IB2014/058559, filed on Jan. 27, 2014, which claims the benefit of U.S. Provisional Patent Application No. 61/761,765, filed on Feb. 7, 2013. These applications are hereby incorporated by reference herein.

FIELD OF THE INVENTION

The present disclosure relates to a lighting system for illuminating an area and a method for controlling such a system. More specifically, the disclosure relates to a lighting system in which a screen forms part of the user control of the lighting system.

BACKGROUND OF THE INVENTION

Lighting systems are used indoors and outdoors, in private as well as public spaces, for a variety of lighting purposes. They may, for example, be installed indoors to provide light in a room. With some such lighting systems it is possible to produce a lighting effect by having light of different colors and intensities emanating from the different light sources of the lighting system. This enables a user to create a certain lighting atmosphere, i.e. a "light scene", in the room; for example, a user may wish the lighting to convey a relaxed feeling.

In advanced lighting systems, simple light switches have often been replaced by more sophisticated user interfaces which frequently involve screens.

U.S. Pat. No. 6,466,234 discloses a lighting system for providing light to one or several spaces, such as rooms in a building. The system includes a user interface having a screen for showing a graphical user interface.

For a lighting system to provide an enjoyable user experience, the physical parts of the system should interfere as little as possible with and/or contribute to the selected light scene. Furthermore, when a lighting system is used in a commercial establishment, such as in hotel rooms, it is also desirable to make use of the lighting system to enhance the overall experience of a customer, in addition to provide light scenes. It is possible to improve existing lighting systems in these respects.

SUMMARY OF THE INVENTION

A general object is thus to provide a lighting system with an enhanced user experience. A particular object is to provide a lighting system the parts of which interfere little with and/or contribute to a selected light scene.

The invention is defined by the independent claims. Embodiments are set forth in the dependent claims and in the description and drawings.

According to a first aspect of the invention, there is provided a control unit for a lighting system having a plurality of light sources and a user interface allowing a user to select a light scene, which user interface has a screen for displaying information to the user. The control unit is adapted to determine settings for at least one of the light sources, which settings cause the lighting system to provide an illumination corresponding to the selected light scene, and to control the user interface to display selected content on the screen, the content being selected such that light emitted from the screen during display of the content contributes to the selected light scene.

A control unit according to the first aspect of the invention, may be implemented in a user control arrangement, suitable to control a lighting system.

According to a second aspect, there is provided a method for controlling a lighting system having light sources for illuminating an area, comprising the steps of displaying a user interface on a screen, which user interface allows a user to select a light scene, receiving a user selection of a light scene, and determining settings at least one of the light sources, which settings are based on the selected light scene. The method further comprises identifying content to display on the screen, said content being selected such that light emitted from the screen when the content is displayed on the screen contributes to the light scene, and displaying the content on the screen.

That "the display contributes to the light scene" should be understood to mean that the content shown on the display matches the selected light scene in some way. For example, the screen may show colors which match the colors of the selected light scene in order to make the screen blend into the environment. Alternatively, the colors may be complementary to the colors of the light scene in order to create a contrasting effect.

The content shown may be based on other parameters than color, such as the feeling conveyed by the light scene. For example, if the light scene conveys a relaxed feeling, the screen may show a picture that conveys the same relaxed feeling.

When the screen is used in this way, i.e. as a part of the light scene created by the lighting system, the screen enhances the light scene and the risk of the screen interfering with the light scene is reduced, resulting in an improved user experience.

The content may further comprise a picture and/or content-aware information, such as a recommendation, a TV program or an advertisement. For example, a suggestion to visit a local spa may be displayed on the screen when a hotel guest selects a light scene which conveys a relaxed feeling. Such content provides additional functionality and may further enhance the user experience.

In addition to the light scene, the content can be based on a parameter chosen from a group consisting of the date, the time of day, the weather and the location of the user in the area. As a simple example, a relaxing image can be a sun dawn during morning, and a sun set during night.

The light scene may be pre-defined by the system, or be manually defined by the users.

The user interface may have a first state, in which it is configured receive input from the user, and a second state, in which it is configured not to receive input from the user. In such a case, the content id may be displayed on the screen only when the user interface is in the second state. Alternatively, the content may be displayed also when the user interface is in the first state.

The screen may be a touch screen. The touch screen may be capable of forming a three-dimensional surface structure, which may be used to further enhance the user experience and contribution to the light scene.

The user interface can be a mobile device, such as a portable panel, a smart phone or a tablet computer. Such a portable user interface provides increased flexibility, and increases the possibilities with the present invention even further.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
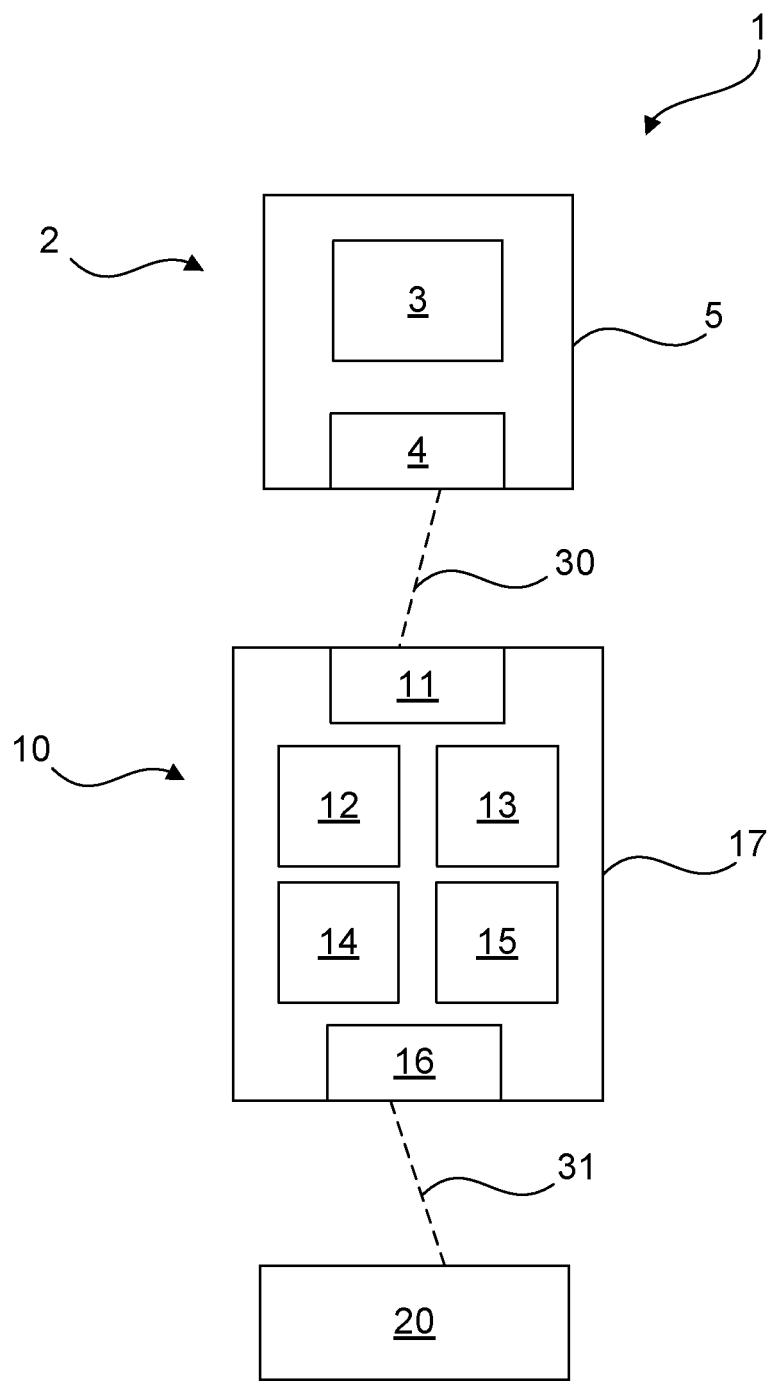
FIG. 1 is a schematic illustration of components of a lighting system.

FIG. 1 illustrates schematically components of a lighting system 1. The system 1 comprises a plurality of lighting devices 2, each of which has at least one light source 3 which may be a LED light. The light source 3 may be enclosed by a housing 5 which also can enclose an interface 4 for communicating with a control unit 10. The control unit 10 has a screen 12, for example an LCD or LED screen, showing information to the user. The control unit 10 can have a housing 17, a processing unit 13, a storage device 14, a user interface 15, and interfaces 11 and 16 for communicating with a lighting device 2 and a network database 20, respectively. The user interface 15 may be an integral part of the control unit 10, for example a stationary device mounted on a wall or a table. Alternatively, the user interface 15 can be a portable device, such as a smart phone, a tablet computer or a dedicated portable device. The user interface 15 can include knobs and/or buttons. The user interface 15 may be a graphical user interface which is shown on the screen 12. The screen 12 may be a touch screen through which the user enters commands to the control unit 10. The screen 12 may be a touch screen on the surface of which a three-dimensional structure may be formed, see for example US 2009174673. Using this technique, it is possible to provide buttons and keys in various shapes on the screen. When not in use, the buttons recede into the surface, leaving a flat screen. This technology may be used to form a keyboard or a surface structure which matches the light scene.

The storage device 14 may comprise volatile and/or non-volatile memory.

The database 20 may be integrated with the control unit 10. Alternatively, the control unit 10 may be configured for connecting with a network-based database 20 which may comprise volatile and/or non-volatile memory.

The dashed lines represent connections 30 and 31 between the components of the lighting system 1. The connection 30 may be a wired connection. The connection 31 may be a wired connection, such as a wired LAN connection, a wireless connection, such as a wireless LAN, CDMA, GSM, 3G or 4G connection. The protocol used for communication between the control unit 10 and the database 20 can be TCP/IP, HTTP, HTTPS, SSL, TSL or a device-specific protocol.

The lighting system 1 allows for the overall control of the lighting in a space, such as a hotel room or a room in a private house. In particular, it allows a user to select a light scene which corresponds to the lighting atmosphere the user wishes to establish within the space. The selected light scene may define parameters such as light intensity, light color and which light sources are switched on. These parameters may be time dependent.

Figure 2:
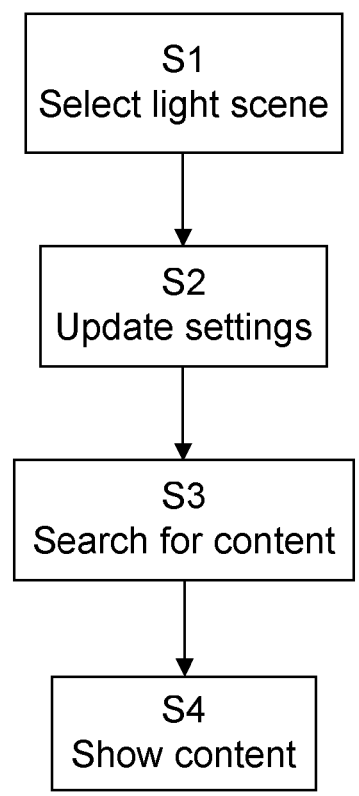
FIG. 2 is a diagrammatic representation of the functioning of the lighting system.

FIG. 2 shows diagrammatically the process to establish a light scene in a space.

In step S1, a user selects a light scene through the user interface 15 of the control unit 10 which shows information on the screen 12 to the user. The information may include information on different light scenes, which light scene is in use at the moment, the state of the lighting devices 2 and/or the light sources 3, the time and date, light intensity and/or color, and a user profile.

The light scene may be preset or defined manually by the user who then sets parameters such as light color, light intensity and which light sources to switch on. The parameters may be time dependent.

In step S2, which occurs after the user has selected a light scene, the control unit 10 connects to the lighting devices 2 via the interfaces 4 and 11 and over the connection 30 in order to update the settings of the light sources 3 to correspond to the selected light scene.

In step S3, the control unit 10 connects to the database 20 via the connection 31 in order to search for content which matches the selected light scene to display on the screen 12.

The content can be selected based on parameters such as: emotional state, color, user profile, date, time of day, weather and user location in the space.

If the user has selected a preset light scene, the control unit 10 can derive from some preset light scene parameters the type of content to be displayed on the screen 12. If the user has defined the light scene manually by directly setting parameters such as light color and light intensity, the control unit 10 may derive the user-desired lighting atmosphere and provide a matching content from information about, for example, which light sources are switched on and the brightness, color and dynamics of the lighting.

If the user has selected a light scene which conveys a particular emotional state, such as relaxation, the control unit 10 can show a picture or some another content that convey a relaxed feeling on the screen 12.

If the content is based on the colors of the light scene, the control unit 10 may show, on the screen 12, content comprising colors which match the colors of the light scene so that the screen 12 blends in with the selected light scene. Alternatively, complementary colors may be shown in order to create a contrasting effect.

The content may be static or dynamic.

The content shown on the screen 12 may be adapted to the overall light level in the space. For example, if the light sources 3 are dimmed, the content may be dark and static or almost static. The brightness of the screen 12 may be adapted to the time of day so that the screen 12 is brighter during the day than during the evening. Additionally, the brightness can be adjusted based on the properties of the selected or manually created scene.

The content may be content-aware information such as an advertisement, a recommendation, a picture and a TV program. For example, if a hotel guest selects a light scene which conveys a relaxed feeling, the screen 12 may show a suggestion to visit a local spa.

In step S4, the control unit 10 shows the retrieved content on the screen 12 when the user interface 15 is not in use. If a user touches or approaches the user interface 15 while the content is shown on the screen 12, the control unit 10 switches to show a graphical user interface. The control unit 10 may also be adapted to show the content on the screen 12 while the user interacts with the user interface 15.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A user control arrangement for a lighting system having a plurality of light sources, the user control arrangement comprising a control unit and a user interface allowing a user to select a light scene, said user interface having a screen for displaying information to the user,
said control unit being adapted to determine settings for at least one of said light sources, wherein said settings cause the lighting system to provide an illumination corresponding to the selected light scene,
said control unit further being adapted to control said user interface to display selected content on said screen, said content being selected such that light emitted from the screen during display of said content contributes to the selected light scene,
wherein said user interface has a first state, in which said user interface is configured to receive input from said user, and a second state, in which said user interface is configured not to receive input from said user, and wherein said user interface is adapted to display said content only in said second state.

2. The user control arrangement according to claim 1, wherein said content comprises an image.

3. The user control arrangement according to claim 1, wherein said content comprises an advertisement.

4. The user control arrangement according to claim 1, wherein said content is based on a parameter chosen from a group consisting of current date, current time of day, weather and location of the user in relation to the system.

5. The user control arrangement according to claim 1, wherein the control unit is configured to select the content based on the selected light scene in response to the user selection of the light scene.

6. The user control arrangement according to claim 1, wherein said user interface is further adapted to allow the user to define said light scene.

7. The user control arrangement according to claim 6, wherein the screen is a touch screen.

8. The user control arrangement according to claim 7, wherein the touch screen is capable of forming a three-dimensional surface structure.

9. The user control arrangement according to claim 8, wherein said user interface is a mobile device, in wireless communication with said control unit.

10. A lighting system, comprising a plurality of light sources for illuminating an area and a user control arrangement according to claim 9.

11. A method for controlling a lighting system having a plurality of light sources for illuminating an area, said method comprising the steps of:
displaying a user interface on a screen, wherein said user interface allows a user to select a light scene,
receiving a user selection of the light scene,
determining settings for at least one of said light sources, wherein said settings are based on the selected light scene,
identifying content to display on the screen, said content being selected such that light emitted from the screen when the content is displayed on the screen contributes to the light scene, and
displaying said content on the screen,
wherein said user interface has a first state, in which said user interface is configured receive input from said user, and a second state, in which said user interface is configured not to receive input from said user, and wherein said content is displayed only when said user interface is in said second state.

12. The method according to claim 11, wherein said user selection includes information defining said light scene.

13. The method according to claim 11, wherein said identifying is performed in response to said receiving and is based on the user selected light scene.

* * * * *